United States Patent
Volchok

(10) Patent No.: US 9,264,507 B2
(45) Date of Patent: Feb. 16, 2016

(54) CROSS DOMAIN COMMUNICATION CHANNEL

(71) Applicant: Alex Volchok, Tel Aviv (IL)

(72) Inventor: Alex Volchok, Tel Aviv (IL)

(73) Assignee: SAP Portals Israel Ltd, Ra'anana (IL)

( * ) Notice: Subject to any disclaimer, the term of this patent is extended or adjusted under 35 U.S.C. 154(b) by 375 days.

(21) Appl. No.: 13/733,708

(22) Filed: Jan. 3, 2013

(65) Prior Publication Data

US 2014/0189049 A1 Jul. 3, 2014

(51) Int. Cl.
G06F 15/16 (2006.01)
H04L 29/08 (2006.01)
G06F 17/30 (2006.01)

(52) U.S. Cl.
CPC ........ *H04L 67/2823* (2013.01); *G06F 17/3089* (2013.01); *H04L 67/02* (2013.01)

(58) Field of Classification Search
CPC .............................. H04L 67/2823; H04L 67/02
See application file for complete search history.

(56) References Cited

U.S. PATENT DOCUMENTS

| 7,606,901 B2 | 10/2009 | Heymann et al. |
| 7,958,516 B2 | 6/2011 | Buerge et al. |
| 7,979,791 B2 | 7/2011 | Yang et al. |
| 8,185,737 B2 | 5/2012 | Isaacs et al. |
| 8,291,475 B2 | 10/2012 | Jackson et al. |
| 8,601,364 B2 | 12/2013 | Jaquish et al. |
| 8,694,784 B1 | 4/2014 | Lekies et al. |
| 8,719,421 B2 | 5/2014 | Mao et al. |
| 2007/0299857 A1 | 12/2007 | Gwozdz et al. |
| 2008/0059413 A1 | 3/2008 | Evans et al. |
| 2009/0299862 A1 | 12/2009 | Fan et al. |
| 2010/0250653 A1* | 9/2010 | Hudgeons et al. ............ 709/203 |
| 2012/0066296 A1* | 3/2012 | Appleton et al. ............ 709/203 |
| 2012/0110469 A1 | 5/2012 | Magarshak |
| 2013/0103736 A1 | 4/2013 | Domsalla |
| 2013/0275272 A1 | 10/2013 | Begin et al. |
| 2014/0047351 A1 | 2/2014 | Cui et al. |

* cited by examiner

*Primary Examiner* — Yves Dalencourt
(74) *Attorney, Agent, or Firm* — Fish & Richardson P.C.

(57) ABSTRACT

Systems, software, and computer implemented methods for consuming services from a cross-domain service server. One example method includes providing for presentation a web page associated with a first domain, the web page including an iFrame associated with a service associated with a second domain; converting a set of data associated with the web page into a form element embedded within the iFrame associated with the second domain; submitting the set of converted data in the form element to the service associated with the second domain via the iFrame; receiving, via the iFrame, a response from the service associated with the second domain; identifying a pre-registered action associated with the received response; and performing the identified pre-registered action in response to receiving the response and identifying the pre-registered action.

19 Claims, 3 Drawing Sheets

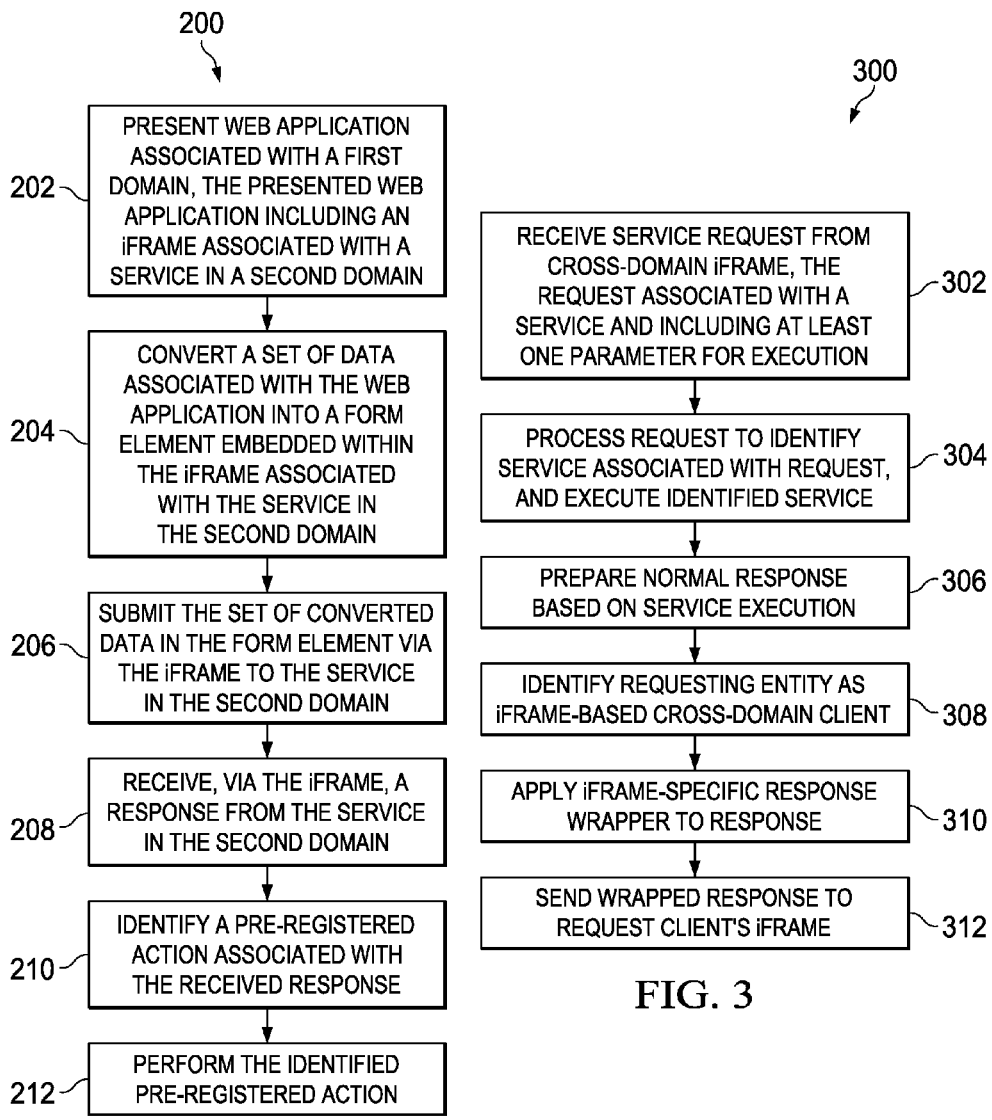

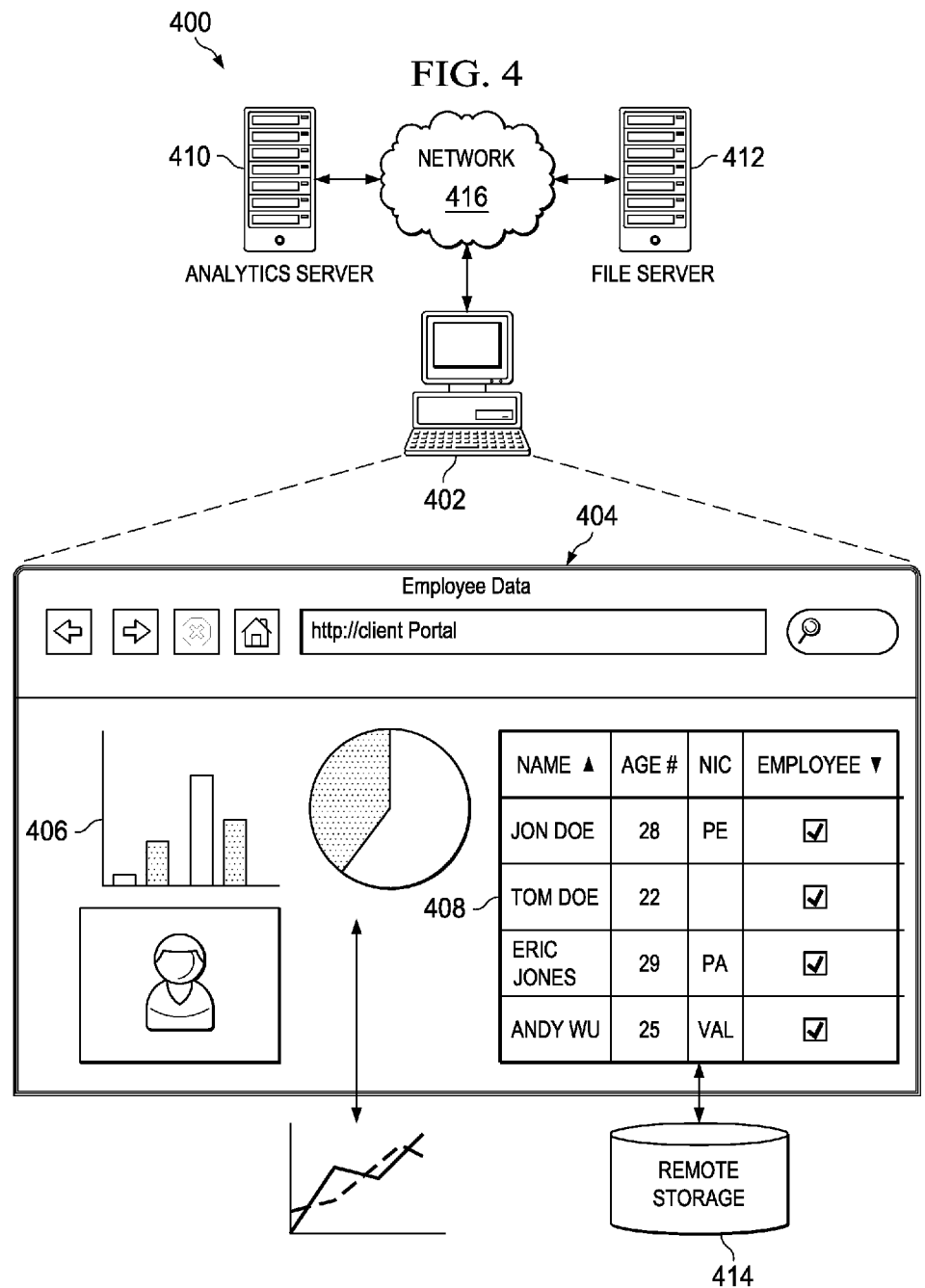

CROSS DOMAIN COMMUNICATION CHANNEL

TECHNICAL FIELD

The present disclosure relates to computer-implemented methods, software, and systems for consuming services from a cross-domain service server.

BACKGROUND

A web page can be used to present content and/or an application to a user. A web page can communicate with a web server using HTTP (HyperText Transfer Protocol). For example, GET and POST commands can be submitted from the web page. Client-side processing can be performed in association with the web page. For example, one or more scripts (e.g., JavaScript scripts) can be executed by a JavaScript engine running in a web browser that is used to present the web page. Scripts can be executed, for example, when the page is loaded or in response to other events, such as events triggered by user input or events triggered, for example, by a timer.

SUMMARY

The present disclosure involves systems, software, and computer implemented methods for consuming services from a cross-domain service server. One example method includes providing for presentation a web page associated with a first domain, the web page including an iFrame associated with a service associated with a second domain. A set of data associated with the web page is converted into a form element embedded within the iFrame associated with the second domain. The set of converted data in the form element is submitted to the service associated with the second domain via the iFrame. A response is received, via the iFrame, from the service associated with the second domain. A pre-registered action associated with the received response is identified. The identified pre-registered action is performed in response to receiving the response and identifying the pre-registered action.

While generally described as computer-implemented software embodied on tangible and non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2 is a flowchart of an example method for submitting a request to a cross-domain service server.

FIG. 3 is a flowchart of an example method for processing a request received from a cross-domain iFrame component.

FIG. 4 is a block diagram illustrating an example system for consuming services from multiple cross-domain service servers.

DETAILED DESCRIPTION

Figure 1:
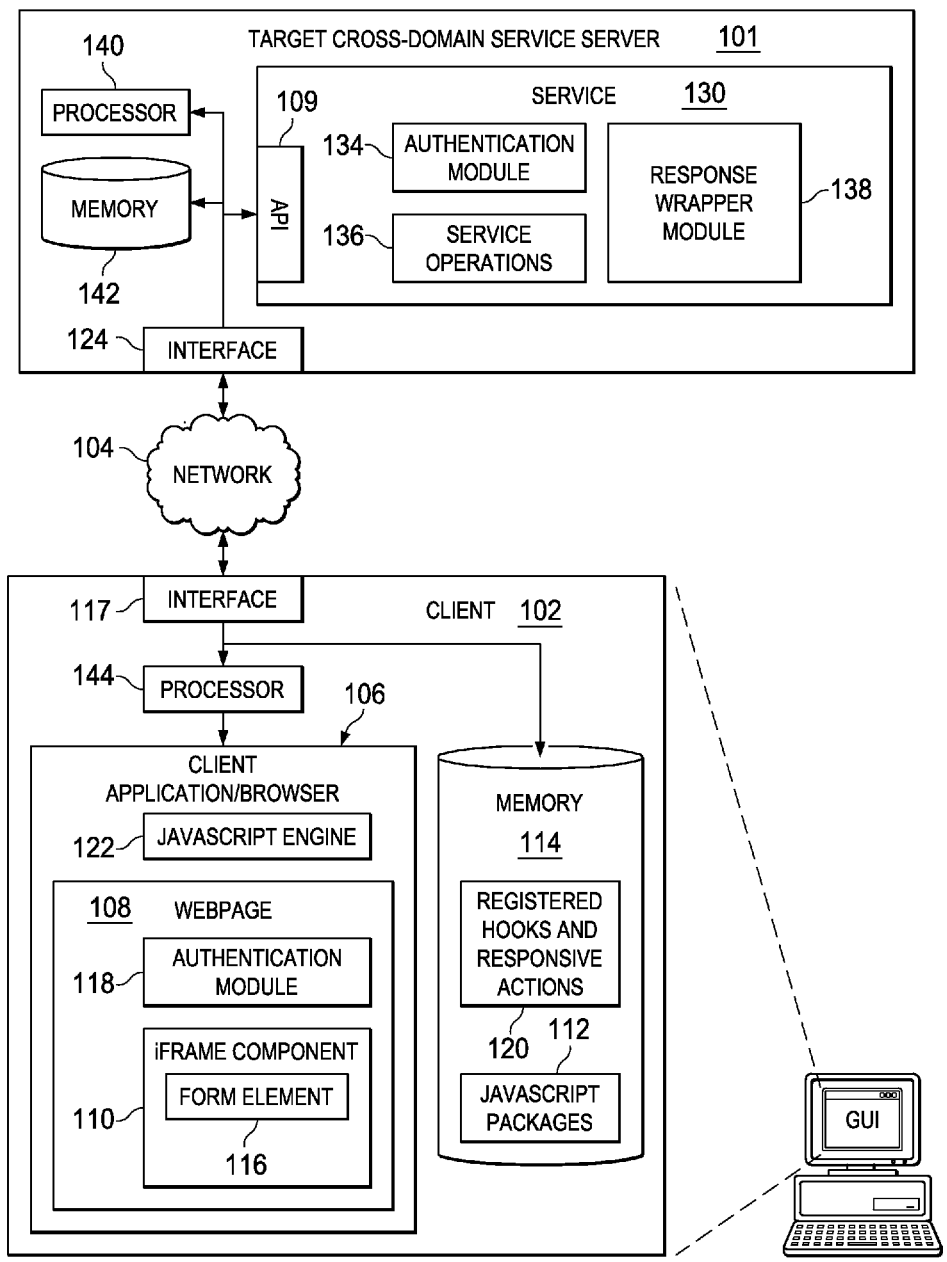
FIG. 1 is a block diagram illustrating an example system for consuming services from a cross-domain service server.

A web application (e.g., running on a web page) can be configured to consume a service, such as a backend service offered by a server or a web service, without requiring complex integration with or complex changes to the server (e.g., without requiring a server-side proxy implementation or complex server-side authentication integration). For example, an iFrame included in the web application and a form element embedded in the iFrame can be used to create a communications channel with the server. A service request can be submitted to the server and the server can execute the service as performed for service requests received from any type of requesting entity and can create a response message associated with the request. The server can identify that the request is from an iFrame-based client and can provide a wrapper for the response message and send the wrapped response message to the web application via the iFrame. The web application can process the response message and can invoke, for example, a callback function based on identifying a particular response or response type in the wrapped response message.

FIG. 1 is a block diagram illustrating an example system 100 for consuming services from a cross-domain service server 101. Specifically, the illustrated environment 100 includes or is communicably coupled with a client 102, the cross-domain service server 101, and a network 104. The client 102 includes an application/browser 106 which presents a web page 108. The web page 108 can, for example, be a web page received from a publisher that is associated with a first domain. As another example, the web page 108 can present a portion of a web-based portal, where the portal is associated with the first domain. The first domain can be referred to as the "client domain." The cross-domain service server 101 can be associated with a second domain, where the second domain is a different domain than the first domain. The second domain can be referred to as the "server domain."

The web page 108 can be configured to submit a request to the cross-domain service server 101. The request can correspond to an API (Application Programming Interface) 109 provided by the cross-domain service server 101 for accessing particular service 130 functionality. The request can be submitted, for example, in response to an event, such as an event triggered by a user input, by the loading of the web page 108, or by expiration of a timer, among others. The application/browser 106 can be configured to implement one or more security policies which may allow the web page 108 to access services provided by the client domain but which limit or restrict the accessing of a service running in the context of a different domain, such as the server domain. For example, the application/browser 106 can implement a "same origin policy." A same origin policy can permit scripts or other objects running on web pages originating from the same domain to access each other's data, such as methods and properties, and can prevent access to data across web pages on different domains. A same origin policy can be implemented to restrict revealing of data and performing state-changing actions, to prevent data loss, and to maintain confidentiality and data integrity.

The web page 108 can, however, submit a request to the cross-domain service server 101 using an iFrame component 110. Sending the request using the iFrame component 110 can overcome, for example, a same origin policy implemented by the application/browser 106. For example, the iFrame component 110 can be configured to be associated with the server domain of the cross-domain service server 101 while being embedded in the web page 108 that is associated with the client domain.

The iFrame component 110 can be configured, for example, to be associated with a service 130 associated with the server domain. For example, the iFrame component 110 can be associated with a server address in the server domain that is associated with a service 130 provided by the cross-domain service server 101. The iFrame component 110 can be hidden (e.g., no visual representation for the user of the web page 108). The iFrame component 110 can be included, for example, in a JavaScript or other package that is embedded in or included in the web page 108, such as a package included in JavaScript packages 112 included in memory 114. The iFrame component 110 can be automatically created, for example, when the JavaScript package 112 is included in or associated with the web page 108.

The iFrame component 110 can include a form element 116. The form element 116 can be, for example, a form document object model (DOM) element within the iFrame component 110. The form element 116 can be created, for example, when the iFrame component 110 is created. Like the iFrame component 110, the form element 116 can be hidden. Data associated with the web page 108 that is to be submitted with the request to the service 130 at the cross-domain service server 101 can be associated with (e.g., converted into) the form element 116. For example, one or more parameters for the request can be embedded into the form element 116. Embedding data in the form element 116 can enable sending of large amounts of data to the cross-domain service server 101, such as data associated with large files, video content, etc.

The set of converted data in the form element 116 can be submitted to the cross-domain service server 101 via the iFrame component 110. For example, a service request can be sent using an HTTP GET or POST command. The submission can be sent to a particular server address in the server domain that is associated with the requested service 130. The request can be sent using an interface 117 of the client 102.

An authentication module 118 can provide authorization credentials to be included in the request. For example, the user of the web page 110 may have logged in to the web page 108 during the current or a previous session. To secure sending of the credentials, HTTPS (HyperText Transfer Protocol over SSL (Secure Sockets Layer)) can be used to submit the request. In some instances, the authentication module 118 may be a part of the application/browser 106, and can apply or associate any suitable credentials to requests, responses, or other actions associated with the web page 108.

In some implementations, the request can be sent using a sendRequest API (not shown). Parameters sent using the sendRequest API can include the name of a pre-registered action (e.g., a callback function to be called when a response is received from the server), data to send to the server (which can be data in, for example, a JSON (JavaScript Object Notation) format or a reference to the form element 116), a response format (e.g., which specifies a type of data for response data, such as text, JSON, XML (eXtensible Markup Language), or JavaScript), and a method type (e.g., get or post).

The pre-registered action can be, for example, a callback function or other hook that is triggered when a response of a particular type is received in response to a request submitted to the cross-domain service server 101. For example, one or more response types or other response indicators or response content can be registered and can be stored in the set of registered hooks and responsive actions 120. In some implementations, the set of registered hooks and responsive actions 120 are included in or otherwise associated with the JavaScript packages 112. The set of registered hooks and responsive actions 120 can include a mapping between respective response types or response content and corresponding respective actions to perform. As described in more detail below, a response can be routed to a pre-registered action upon receipt of the response and can be executed by a JavaScript engine 122.

The service request from the client 102 can be received at the cross-domain service server 101 using an interface 124. A service component 130 can extract parameters included in the request. An authentication module 134 can authenticate the request, such as verifying credentials included in the request. The service component 130 can verify whether the request corresponds to a defined service included in a service operations component 136. If the request corresponds to a defined service, the service operations component 136 can execute the service, which can result in service output.

The service operations component 136 can prepare a response based on the service execution. The response can include output(s) generated during service execution. A response wrapper module 138 can determine that the request is a request received from an iFrame-based cross-domain client and can identify a response wrapper to associate with the response. For example, the response wrapper module 138 can apply an iFrame-specific response wrapper to the response. A wrapped response can be sent to the client 102 using the interface 124 and can be received by the client 102 using the interface 117.

The response can be received via the iFrame component 110. Upon receipt of the response, the JavaScript engine 122 can, using the set of registered hooks and responsive actions 120, identify a pre-registered action associated with the received response. The pre-registered action can be identified, for example, based on the contents of the response. The JavaScript engine 122 can perform the identified pre-registered action. Performing the pre-registered action can include, for example, one or more of processing data included in the response, updating the web page 108, redirecting the web page 108 to another location, submitting another service request to the cross-domain service server 101, or submitting a service request to a different cross-domain service server (e.g., to a server that provides one or more services not provided by the cross-domain service server 101), among other actions.

As used in the present disclosure, the term "computer" is intended to encompass any suitable processing device. For example, although FIG. 1 illustrates a single cross-domain service server 101, the environment 100 can be implemented using two or more cross-domain service servers, as well as computers other than servers, including a server pool. Indeed, the cross-domain service server 101 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the cross-domain service server 101 may be adapted to execute any operating system, including Linux, UNIX, Windows, Mac OS®, Java™, Android™, iOS or any other suitable operating system. According to one implementation, the cross-domain service server 101 may also include or be communicably coupled with an e-mail server, a Web server, a caching server, a streaming data server, and/or other suitable server.

The interface 124 is used by the cross-domain service server 101 for communicating with other systems in a distributed environment—including within the environment 100—connected to the network 104; for example, the client device 102, as well as other systems communicably coupled to the network 104. Generally, the interface 124 comprises logic encoded in software and/or hardware in a suitable combination and operable to communicate with the network 104. More specifically, the interface 124 may comprise software supporting one or more communication protocols associated with communications such that the network 104 or interface's hardware is operable to communicate physical signals within and outside of the illustrated environment 100.

The cross-domain service server 101 further includes one or more processors 140. Each processor 140 included in the cross-domain service server 101 may be a central processing unit (CPU), a blade, an application specific integrated circuit (ASIC), a field-programmable gate array (FPGA), or another suitable component. Generally, each processor 140 included in the cross-domain service server 101 executes instructions and manipulates data to perform the operations of the cross-domain service server 101. Specifically, each processor 140 included in the cross-domain service server 101 executes the functionality required to receive and respond to requests from the client device 102, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The cross-domain service server 101 includes the memory 142 (or, in some implementations, multiple memories). The memory 142 included in the cross-domain service server 101 may include any type of memory or database module and may take the form of volatile and/or non-volatile memory including, without limitation, magnetic media, optical media, random access memory (RAM), read-only memory (ROM), removable media, or any other suitable local or remote memory component. The memory 142 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the cross-domain service server 101.

The client device 102 may generally be any computing device operable to connect to or communicate with at least the cross-domain service server 101 via the network 104 using a wireline or wireless connection. In general, the client device 102 comprises an electronic computer device operable to receive, transmit, process, and store any appropriate data associated with the environment 100 of FIG. 1. The client device 102 can include one or more client applications, including the application/browser 106. A client application is any type of application that allows the client device 102 to request and view content on the client device 102. In some implementations, a client application can use parameters, metadata, and other information received at launch to access a particular set of data from the cross-domain service server 101. In some instances, a client application may be an agent or client-side version of the one or more enterprise applications running on the cross-domain service server 101.

The interface 117 of the client device 102 can be for communicating with other systems in a distributed environment—including within the environment 100—connected to the network 104; for example, the cross-domain service server 101, as well as other systems communicably coupled to the network 104. Generally, the interface 117 comprises logic encoded in software and/or hardware in a suitable combination and operable to communicate with the network 104. More specifically, the interface 117 may comprise software supporting one or more communication protocols associated with communications such that the network 104 or interface's hardware is operable to communicate physical signals within and outside of the illustrated environment 100.

The client device 102 further includes one or more processors 144. Each processor 144 included in the client device 102 may be a central processing unit (CPU), an application specific integrated circuit (ASIC), a field-programmable gate array (FPGA), or another suitable component. Generally, each processor 144 included in the client device 102 executes instructions and manipulates data to perform the operations of the client device 102. Specifically, each processor 144 included in the client device 102 executes the functionality required to send requests to the cross-domain service server 101 and to receive and process responses from the cross-domain service server 101.

The memory 114 included in the client device 102 may include any memory or database module and may take the form of volatile or non-volatile memory including, without limitation, magnetic media, optical media, random access memory (RAM), read-only memory (ROM), removable media, or any other suitable local or remote memory component. The memory 114 may store various objects or data, including the JavaScript packages 112, DOM elements, the set of registered hooks and responsive actions 120, user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

There may be any number of client devices 102 associated with, or external to, the environment 100. For example, while the illustrated environment 100 includes one client device 102, alternative implementations of the environment 100 may include any number of client devices 102 communicably coupled to the cross-domain service server 101 and/or the network 104. Additionally, there may also be one or more additional client devices 102 external to the illustrated portion of environment 100 that are capable of interacting with the environment 100 via the network 104. Further, the term "client", "client device" and "user" may be used interchangeably as appropriate without departing from the scope of this disclosure. Moreover, while the client device 102 is described in terms of being used by a single user, this disclosure contemplates that many users may use one computer, or that one user may use multiple computers.

The client device 102 is generally intended to encompass any client computing device such as a laptop/notebook computer, wireless data port, smart phone, personal data assistant (PDA), tablet computing device, one or more processors within these devices, or any other suitable processing device. For example, the client device 102 may comprise a computer that includes an input device, such as a keypad, touch screen, or other device that can accept user information, and an output device that conveys information associated with the operation of the cross-domain service server 101 or the client device 102 itself, including digital data, visual information, or a graphical user interface.

FIG. 2 is a flowchart of an example method 200 for submitting a request to a cross-domain service server. For clarity of presentation, the description that follows generally describes method 200 and related methods in the context of FIG. 1. However, it will be understood that method 200 and related methods may be performed, for example, by any other suitable system, environment, software, and hardware, or a combination of systems, environments, software, and hardware, as appropriate. For example, one or more of a client, the cross-domain service server, or other computing device (not illustrated) can be used to execute method 200 and related methods and obtain any data from the memory of a client, the cross-domain service server, or the other computing device (not illustrated).

At 202, a web page associated with a first domain is provided for presentation, the web page including an iFrame associated with a service associated with a second domain. The web page can be or can include, for example, a web application. As another example, the web page can be or can include a portion of a web-based portal. The service associated with the second domain can be, for example, a file-storing service, an in-memory database service, an analytics service, or some other type of service.

The iFrame can be, for example, a DOM iFrame element. In some implementations, the iFrame is hidden when the web page is presented. In some implementations, the iFrame is associated with a particular server address in the second domain, where the particular server address is associated with the service associated with the second domain. In some implementations, the web page includes at least one other iFrame associated with a second service associated with a third domain. For example, the first service can be a file-storing service, the second domain and the iFrame can be associated with the file-storing service, the second service can be an analytics service, and the third domain and the second iFrame can be associated with the analytics service.

At 204, a set of data associated with the web page is converted into a form element embedded within the iFrame associated with the second domain. For example, parameters to be provided to the service can be embedded in the form element. The form element can be, for example, a DOM form element.

At 206, the set of converted data in the form element is submitted, via the iFrame, to the service associated with the second domain. Submission of the set of converted data in the form element can be performed, for example, via a GET or POST command. The submission can be sent to a particular server address in the second domain associated with the service. Authorization credentials can be included in the submission. A browser on which the web page is presented can allow the submission via the iFrame to the particular server address in the second domain, whereas the browser may restrict a submission to the particular server address in the second domain for a submission performed not via the iFrame.

At 208, a response is received, via the iFrame, from the service associated with the second domain. The response can include one or more of a response type indicator, an identification of a pre-registered action, and other data. In some implementations, the response is in a JavaScript format. Other formats can be used, such as text, XML, or JSON. In some implementations, an example response can be:

```
<script> parent.postMessage( '{ "hook" :
"document_added" , "status" : "OK" , "server_response"
: "example server response data" , "siteVersion":
1339311392150, "requestId" : "f680b702-b0e6-45f6-a18b-
08345eba674e" , "contentType" : "text\/plain" ,
"objectId" : "14ec2a5005812fc0f1544df4 "} ' ,
'https://clientdomain.com')</script>.
```

At 210, a pre-registered action associated with the received response is identified. The pre-registered action can be identified, for example, based on the contents of the response received via the iFrame. The pre-registered action can be, for example, a hook, callback, or other function or event. In the example response shown above, "document_added" can be identified as a pre-registered action. In some implementations, the parent.postMessage method code included in the above example response can be executed by a JavaScript engine which can result in a message being posted to the web page, which is the parent of the iFrame. The "document_added" pre-registered action can be identified as part of the processing of the posted message.

At 212, the identified pre-registered action is performed in response to receiving the response and identifying the pre-registered action. For example, performing the pre-registered action can include redirection of at least a portion of the web page. Other examples of performing the pre-registered action include processing of data included in the response, submitting another request for another service, and requesting user input from a user of the web page. Performing the pre-registered action can include extracting data provided by the service from the response and using the extracted data. For example, in the above example response message, the "server_response" field and corresponding "example server response data" data can be identified, and the "example server response data" can be used during performance of the pre-registered action.

FIG. 3 is a flowchart of an example method 300 for processing a request received from a cross-domain iFrame component. For clarity of presentation, the description that follows generally describes method 300 and related methods in the context of FIG. 1. However, it will be understood that method 300 and related methods may be performed, for example, by any other suitable system, environment, software, and hardware, or a combination of systems, environments, software, and hardware, as appropriate. For example, one or more of the cross-domain service server, a client, or other computing device (not illustrated) can be used to execute method 200 and related methods and obtain any data from the memory of a client, the cross-domain service server, or the other computing device (not illustrated).

At 302, a service request is received from a cross-domain iFrame, the request associated with a service and including at least one parameter for execution. The request can be received, for example, as a submission of a form that is embedded in the cross-domain iFrame. The iFrame can be associated, for example, with a first domain, where the service request is received at a second domain different than the first domain.

At 304, the request is processed to identify a service associated with the request and the identified service is executed. Executing the service can include verifying authorization credentials included in the request. For some or all requests, output data can be generated during execution of the service. The service can be associated, for example, with a second domain.

At 306, a normal response is prepared based on service execution. A "normal response" is a response that is prepared for any execution of the service, whether in response to a request from a cross-domain iFrame or a request from some other type of requesting entity. The normal response can include, for example, data generated from execution of the service. The normal response can be, for example, a cross-domain message that is structured in JavaScript or some other format.

At 308, a requesting entity is identified as an iFrame-based cross-domain client. At 310, in response to identifying the requesting entity as an iFrame-based cross domain client, an iFrame-specific response wrapper is applied to the response. For example, in some implementations, an example wrapped response can be:

```
<script> parent.postMessage( '{ "hook" :
"document_added" , "status" : "OK" , "server_response"
: "example server response data" , "siteVersion":
1339311392150, "requestId" : "f680b702-b0e6-45f6-a18b-
08345eba674e" , "contentType" : "text\/plain" ,
"objectId" : "14ec2a5005812fc0f1544df4 "} ' ,
'https://clientdomain.com')</script>.
```

In the example wrapped response, "example server response data" can be the response and the other portions of the example wrapped response can be the iFrame-specific response wrapper.

At 312, the wrapped response is sent to the request client's iFrame. For example, a cross-domain message can be sent to the iFrame at the first domain.

FIG. 4 is a block diagram illustrating an example system 400 for consuming services from multiple cross-domain service servers. The system 400 includes a client 402 presenting a web page 404. The web page 404 is an employee data page for a web portal. The web page 404 includes a chart 406 and a grid 408.

The web page 404 can request a first service from an analytics server 410 to produce data for the chart 406 (or, in some implementations, to produce the chart 406). The web page 404 can request a second service from a file server 412 to retrieve data for the grid 408 from remote storage 414 managed by the file server 412. The requests for the first and second services can be sent, for example, over a network 116. The analytics server 410 and the first service can be associated with a first domain, the file server 412 and the second service can be associated with a second domain, and the web page 404 can be associated with a third domain.

A first iFrame can be created and associated with the first service and with the first domain, and a second iFrame can be created and associated with the second service and with the second domain. Both the first and second iFrames can each include an embedded form. The web page 404 can submit the request for the first service to the analytics server using the first iFrame and can submit the request for the second service to the file server 412 using the second iFrame.

One or more hooks can be registered in association with the web page 404 for one or more response types which may be included in responses from the first service. Similarly, one or more hooks can be registered in association with the web page 404 for one or more response types which may be included in responses from the second service. A particular hook can be identified and invoked in response to receipt of a response message from either the first or second service.

The preceding figures and accompanying description illustrate example processes and computer-implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors, the method comprising:
providing for presentation a web page associated with a first domain, the web page including an iFrame associated with a service associated with a second domain, the iFrame including a form object instance of a form element type;
converting a set of data associated with the web page into the form object instance, including embedding one or more parameters for the service into the form object instance;
submitting the set of converted data in the form object instance and a reference to the form object instance to the service associated with the second domain via the iFrame;
receiving, via the iFrame, a response from the service associated with the second domain;
identifying a pre-registered action associated with the received response; and
performing the identified pre-registered action in response to receiving the response and identifying the pre-registered action.

2. The method of claim 1, wherein the iFrame and the form object instance are hidden when the web page is presented.

3. The method of claim 1, wherein the iFrame is associated with a particular server address in the second domain, the particular server address associated with the service associated with the second domain.

4. The method of claim 1, wherein the web page includes at least one other iFrame associated with a second service associated with a third domain, the other iFrame including a second, different form object instance.

5. The method of claim 1, wherein submitting the set of converted data in the form object instance to the service is performed via a GET or POST command.

6. The method of claim 5, wherein the submission is sent to a particular server address in the second domain associated with the service.

7. The method of claim 1, where the pre-registered action is a hook, callback, or function.

8. The method of claim 7, where the pre-registered action is identified based on the contents of the response received via the iFrame.

9. The method of claim 1, wherein performing the identified pre-registered action in response to receiving the response and identifying the pre-registered action includes redirection of at least a portion of the web page.

10. The method of claim 1, wherein the web page comprises a web application.

11. The method of claim 1, wherein the web page comprises a portion of a web-based portal.

12. A system comprising:
one or more computers associated with an enterprise portal; and
a non-transitory computer-readable medium coupled to the one or more computers having instructions stored thereon which, when executed by the one or more computers, cause the one or more computers to perform operations comprising:
providing for presentation a web page associated with a first domain, the web page including an iFrame associated with a service associated with a second domain, the iFrame including a form object instance of a form element type;
converting a set of data associated with the web page into the form object instance, including embedding one or more parameters for the service into the form object instance;
submitting the set of converted data in the form object instance and a reference to the form object instance to the service associated with the second domain via the iFrame;
receiving, via the iFrame, a response from the service associated with the second domain;
identifying a pre-registered action associated with the received response; and
performing the identified pre-registered action in response to receiving the response and identifying the pre-registered action.

13. The system of claim 12, wherein the iFrame and the form object instance are hidden when the web page is presented.

14. The system of claim 12, where the pre-registered action is a hook, callback, or function.

15. The system of claim 14, where the pre-registered action is identified based on the contents of the response received via the iFrame.

16. A computer program product encoded on a non-transitory storage medium, the product comprising non-transitory, computer readable instructions for causing one or more processors to perform operations comprising:
providing for presentation a web page associated with a first domain, the web page including a first iFrame associated with a first service associated with a second domain and a second iFrame associated with a second service associated with a third domain, the first iFrame including a first form object instance of a form element type, and the second iFrame including a second form object instance of the form element type;
converting a first set of data associated with the web page into the first form object instance, including embedding one or more parameters for the first service into the first form object instance;
converting a second set of data associated with the web page into the second form object instance, including embedding one or more parameters for the second service into the second form object instance;
submitting the first set of converted data in the first form object instance and a reference to the first form object instance to the first service associated with the second domain via the first iFrame;
submitting the second set of converted data in the second form object instance and a reference to the second form object instance to the second service associated with the third domain via the second iFrame;
receiving, via the first iFrame, a first response, from the first service associated with the second domain;
identifying a first pre-registered action associated with the received first response;
performing the identified first pre-registered action in response to receiving the first response and identifying the first pre-registered action;
receiving, via the second iFrame, a second response, from the second service associated with the third domain;
identifying a second pre-registered action associated with the received second response; and
performing the identified second pre-registered action in response to receiving the second response and identifying the second pre-registered action.

17. The product of claim 16, wherein the first iFrame and the first form object instance are hidden when the web page is presented.

18. The product of claim 16, where the first pre-registered action is a hook, callback, or function.

19. The product of claim 17, where the first pre-registered action is identified based on the contents of the first response received via the first iFrame.

* * * * *